(12) United States Patent
Lee et al.

(10) Patent No.: US 9,425,905 B2
(45) Date of Patent: Aug. 23, 2016

(54) RECEIVER FOR BODY CHANNEL COMMUNICATION AND A METHOD OF OPERATING A RECEIVER THEREFROM

(71) Applicant: Agency for Science, Technology and Research, Singapore (SG)

(72) Inventors: Jung Hyup Lee, Singapore (SG); Vishal Vinayak Kulkarni, Singapore (SG); Tao Wang, Singapore (SG); Jun Zhou, Singapore (SG); Xin Liu, Singapore (SG); Minkyu Je, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 252 days.

(21) Appl. No.: 14/022,122

(22) Filed: Sep. 9, 2013

(65) Prior Publication Data
US 2014/0080430 A1    Mar. 20, 2014

(30) Foreign Application Priority Data
Sep. 7, 2012    (SG) .................................. 201206664

(51) Int. Cl.
*H04B 1/02* (2006.01)
*H04B 13/00* (2006.01)

(52) U.S. Cl.
CPC .................................. *H04B 13/005* (2013.01)

(58) Field of Classification Search
CPC ................................. H04B 13/005; H04B 7/24
USPC ........................................................... 455/91
See application file for complete search history.

(56) References Cited

U.S. PATENT DOCUMENTS

| | | | | |
|---|---|---|---|---|
| 3,835,840 A | * | 9/1974 | Mount | A61B 5/0535 324/692 |
| 3,996,925 A | * | 12/1976 | Djordjevich | A61B 5/0535 324/692 |
| 4,489,417 A | * | 12/1984 | Askin et al. | 375/287 |
| 6,369,659 B1 | * | 4/2002 | Delzer | H03L 7/083 331/10 |
| 7,215,721 B2 | * | 5/2007 | Hietala | H04L 1/004 375/317 |

(Continued)

FOREIGN PATENT DOCUMENTS

| | | |
|---|---|---|
| WO | WO 2009/075420 A1 | 6/2009 |
| WO | WO 2010/146490 A1 | 12/2010 |

OTHER PUBLICATIONS

Search Report issued by the Austrian Patent Office on behalf of the Intellectual Property Office of Singapore (IPOS) for corresponding Singapore Patent Application No. 2013067491, 6 pages, (Nov. 27, 2014).

(Continued)

*Primary Examiner* — Ajibola Akinyemi
(74) *Attorney, Agent, or Firm* — Blakely, Sokoloff, Taylor & Zafman LLP (57) ABSTRACT

In various embodiments of the present disclosure, there is provided a receiver for body channel communication. The receiver includes an electrode configured to receive an incoming signal transmitted as a multi-level transmission signal from a transmitter through a body channel, a differentiator configured to obtain a time derivative of the incoming signal indicating a plurality of data transitions, and an analog to digital converter configured to generate a multi-level output signal representing the multi-level transmission signal based on the plurality of data transitions. A corresponding method of controlling a receiver for body channel communications is provided.

18 Claims, 7 Drawing Sheets

(56) References Cited

U.S. PATENT DOCUMENTS

| | | |
|---|---|---|
| 7,656,238 B2 | 2/2010 | Suh et al. |
| 2007/0211828 A1 | 9/2007 | Song et al. |
| 2009/0103643 A1 | 4/2009 | Hyoung et al. |
| 2010/0060534 A1 | 3/2010 | Oodachi |
| 2011/0080984 A1 | 4/2011 | Hyoung |

OTHER PUBLICATIONS

Written Opinion issued by the Austrian Patent Office on behalf of the Intellectual Property Office of Singapore (IPOS) for corresponding Singapore Patent Application No. 2013067491, 6 pages, (Nov. 27, 2014).

Namjun Cho, et al., "A 10.8 mW Body Channel Communication/MICS Dual-Band Transceiver for a Unified Body Sensor Network Controller", IEEE Journal of Solid-State Circuits, vol. 44, No. 12, pp. 3459-3468, (Dec. 2009).

Arto V. Nurmikko, et al., "Listening to Brain Microcircuits for Interfacing With External World—Progress in Wireless Implantable Microelectronic Neuroengineering Devices", Proceedings of the IEEE, vol. 98, No. 3, pp. 375-388, (Mar. 2010).

Moo Sung Chae, et al., "A 128-Channel 6 mW Wireless Neural Recording IC With Spike Feature Extraction and UWB Transmitter", IEEE Transactions on Neural Systems and Rehabilitation Engineering, vol. 17, No. 4, pp. 312-321, (Aug. 2009).

Hua Gao, et al., "HermesE: A 96-Channel Full Data Rate Direct Neural Interface in 0.13 μm CMOS", IEEE Journal of Solid-State Circuits, vol. 47, No. 4, pp. 1043-1055, (Apr. 2012).

Zhiming Chen, et al., "A 3.4-mW 54.24-Mbps Burst-Mode Injection-Locked CMOS FSK Transmitter", IEEE Asian Solid-State Circuits Conference, Jeju, Korea, pp. 289-292, (Nov. 14-16, 2011).

Seong-Jun Song, et al., "A 0.2-mW 2-Mb/s Digital Transceiver Based on Wideband Signaling for Human Body Communications", IEEE Journal of Solid-State Circuits, vol. 42, No. 9, pp. 2021-2033, (Sep. 2007).

Alberto Fazzi, et al., "A 2.75mW Wideband Correlation-Based Transceiver for Body-Coupled Communication", IEEE International Solid-State Circuits Conference, pp. 204-205, (2009).

Seong-Jun Song, et al., "A 0.9V 2.6mW Body-Coupled Scalable PHY Transceiver for Body Sensor Applications", IEEE International Solid-State Circuits Conference, pp. 366-367, (2007).

Ruoyu Xu, et al., "Equation Environment Coupling and Interference on the Electric-Field Intrabody Communication Channel", IEEE Transactions on Biomedical Engineering, vol. 59, No. 7, pp. 2051-2059, (Jul. 2012).

* cited by examiner

ND A METHOD OF
RECEIVER FOR BODY CHANNEL COMMUNICATION AND A METHOD OF OPERATING A RECEIVER THEREFROM

RELATED APPLICATIONS

This application claims the benefit of Singapore Patent Application no. 201206664-3, filed on 7 Sep. 2012. The disclosure of the above priority application is hereby incorporated by reference in its entirety.

TECHNICAL FIELD

The present disclosure describes embodiments generally relating to a receiver for body channel communication and a method of operating a receiver therefrom.

BACKGROUND

With the proliferation of personal electronics comes a genre of wearable personal electronics. Of interest is how wearable personal electronic devices like wrist-watch computers, earphones, video eyeglasses, and head-mounted displays, etc., can communicate with each other. Present communication schemes include Wi-Fi, Bluetooth and Near-Field Communications (NFC), but such over the air communication schemes require relatively large and power consuming antennas or transceivers. Body channel communication (BCC) has been proposed as an alternative, where the human body is used as a transmission medium. A connection between communicating devices can be carried out at MHz frequencies without large couplings because the signals transmit between the conductive human tissue of the body coupled transceiver and the floated ground with a capacitive return path. BCC is also defined in operating standards in relation to body area network (BAN) under IEEE 802.15. Some applications which utilizes BCC are for example in: a body sensor network, health monitoring, wearable audio devices, personal video devices, etc.

In health monitoring, one area which is eliciting interest is that of neural recording microsystems. In neural recording microsystems, it is essential to continuously acquire a neural signal at high spatial and temporal resolution with an implanted neural probe array so that brain activities can be monitored and decoded in real time. The required data rate for acquisition of an electrode probe array of around 100 channels is several tens of Mbps, in order to transmit this information from the body with high data rate wireless techniques based on ultra-wide-band (UWB) or frequency-shift-keying (FSK).

BCC supports such a neural recording microsystem application by communicating over 1-meter distance in the human body with low power consumption. However, the highest data rate among the recently developed body channel transceivers is just 10 Mbps, which is significantly less than the required data rate for the neural recording system. This is mainly due to the limitations in system architecture and available channel bandwidth.

There is as such a desire for a low power transceiver for BCC which provides for communication at a high data rate.

SUMMARY

According to various embodiments in the present disclosure, there is provided a receiver for body channel communication including an electrode configured to receive an incoming signal transmitted as a multi-level transmission signal from a transmitter through a body channel, a differentiator configured to obtain a time derivative of the incoming signal, and an analog to digital converter configured to generate a multi-level representation signal representing the multi-level transmission signal based on the time derivative.

According to various embodiments in the present disclosure, there is provided a method of controlling a receiver for body channel communication, including receiving an incoming signal transmitted as a multi-level transmission signal from a transmitter through a body channel, obtaining a time derivative of the incoming signal, and generating a multi-level representation signal representing the multi-level transmission signal based on the time derivative.

According to an embodiment, there is provided a transmitter for body channel communication including a driver configured to generate a multi-level transmission signal including at least three signal levels, and a transmission electrode configured to transmit the multi-level transmission signal through a body channel.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Figure 1:
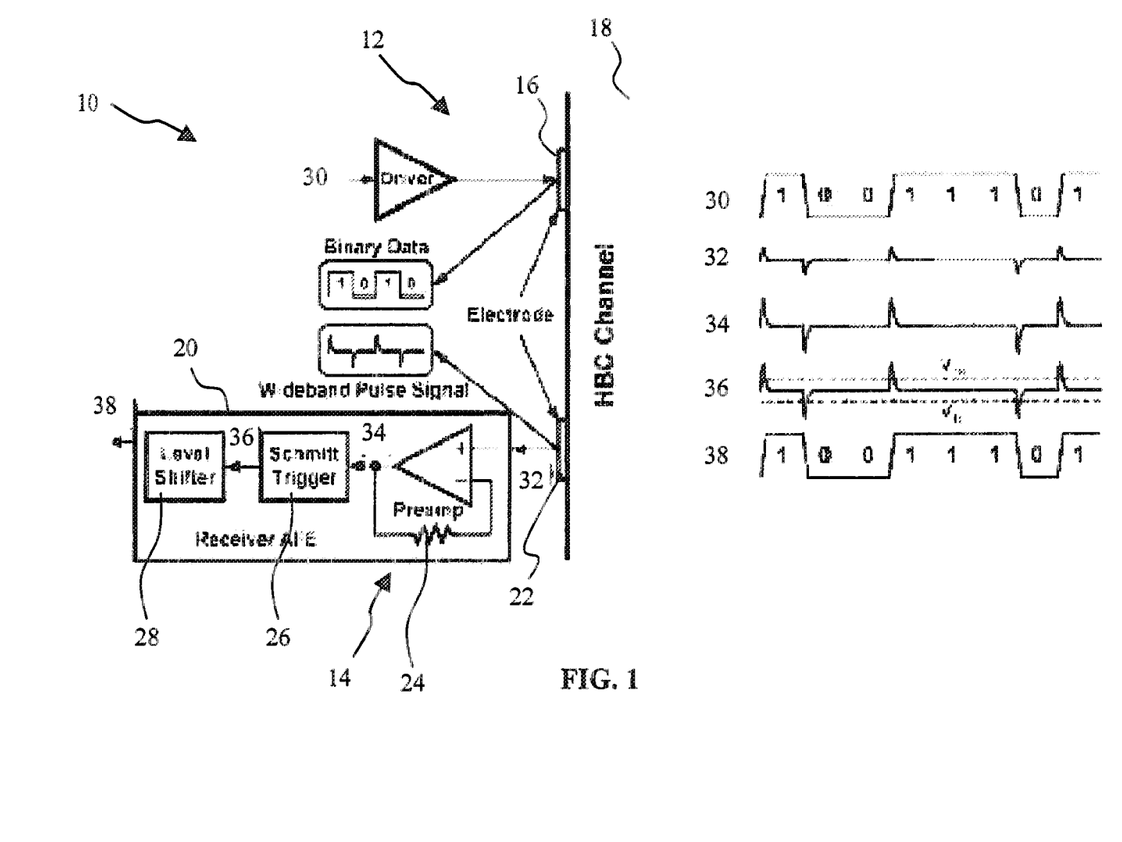
FIG. 1 illustrates a presently available wideband signaling BCC transceiver.

Various digital body channel communication (BCC) transceivers for BCC communication have been proposed, for example a digital BCC transceiver utilizing a wideband signaling (WBS) method. FIG. 1 illustrates a presently available wideband signaling BCC transceiver. In such a BCC transceiver 10, a direct digital transmitter 12 and a BCC receiver 14 are provided. The transmitter transmits digital data, notably binary digital data, through a driver to the human. The driver is connected to a transmitting electrode 16 which introduces an electric field on the skin of the human body 18. The BCC receiver 14 includes an analog front-end (AFE) 20 which includes a pre-amplifier 24, a Schmitt trigger 26 which is a comparator with hysteresis, and a level shifter 28.

The AFE 20 amplifies, triggers, inverts, and shifts the received wideband pulse signal in order to recover the binary data as received through receiving electrode 22. When the binary data 30 is directly transmitted into the human body, the channel outputs a narrow small pulse signal 32 that includes positive and negative pulses which have no DC offset. The received pulse signal 32, which may be attenuated by the channel, is sufficiently amplified 34 for wide bandwidth by the pre-amplifier 24, and subsequently triggered to positive and negative states 36 by using two symmetric thresholds such that the symmetric operation provides a duty cycle of 50%. Consequently, the binary data 38 can be recovered by inverting and shifting the triggered signal.

Embodiments of a receiver for body channel communication and a method for operating a receiver for body channel communication are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. The system according to various embodiments can include a controller which may include a memory which is for example used in the processing carried out by portions of the receiver. In embodiments, a receiver and/or a transceiver for BCC operation can include memory. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom.

Figure 2:
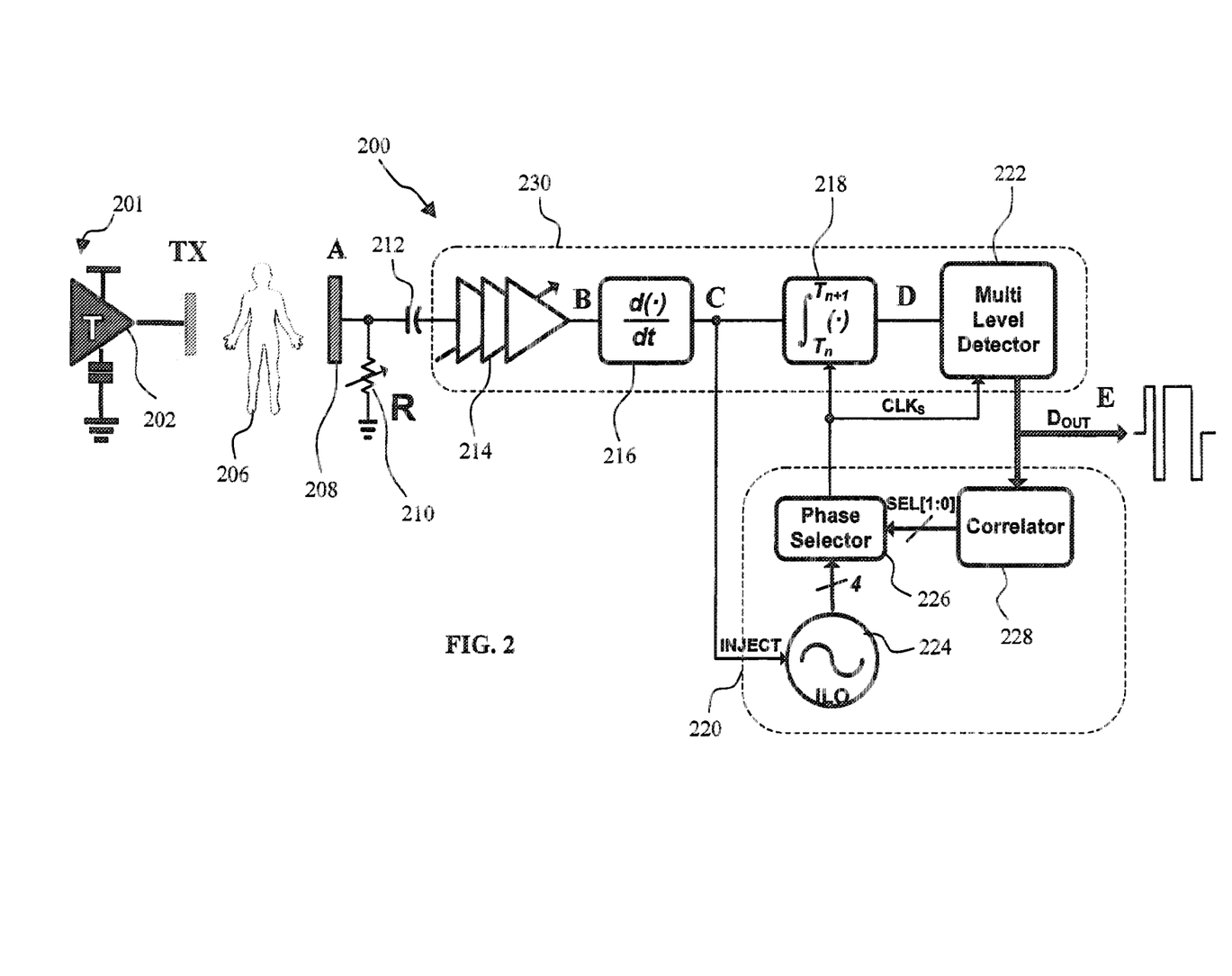
FIG. 2 illustrates a receiver for body channel communication according to an embodiment.

FIG. 2 illustrates a receiver for body channel communication according to an embodiment. According to various embodiments, receiver 200 is provided together with a transmitter 201 in carrying out a BCC application. Transmitter 201 includes a driver 202 which transmits digital data as an input transmission signal to a transmission electrode 204 and thereafter into a human body or a body channel 206 in a human body. The transmission signal travels through a portion of the human body and is received by a reception electrode 208. The transmission signal can be passed either across human skin, or it can pass through the surface of the skin and out thereafter.

According to various embodiments, a multi-level transmission signal is used for body channel communication. Utilizing a multi-level signal operation allows for greater modulation of the carrying waveform, which in turn provides for more data to be carried over a single transmission. As can be understood, a multi-level signal is typically defined as providing a waveform signal with multiple data levels in order to carry more information. For example, as compared with a typical binary signaling scheme, which allows for just a 0-state and a 1-state possibility for each symbol of information, a 3-level multi-level signaling scheme allows for a symbol with 3 state possibilities—a −1-state, a 0-state, and a 1-state, with the same carrier bandwidth.

However, as mentioned above, transmitting a signal through a body channel typically results in a received transmission with an undefined DC or reference level, as well as uncertain data level transitions. The physical deterioration of the signal as such makes the demodulation of multi-level signal transmission much more difficult to achieve.

The distance of the transmission electrode 204 to the reception electrode 208 can be in the order of tens of millimeters, or tens of centimeters, or up to one meter in separation distance. In an embodiment, the distance between the transmission electrode 204 and the reception electrode 208 can be up to two meters.

In various embodiments, the receiver 200 and the transmitter 201 are provided as part of a pair of devices designed for use in BCC, for example, a neural headband with a BCC transmitter, and a wrist-worn computer with a BCC receiver. In various embodiments, the receiver 200 is provided independent of any transmitter but is configured to receive incoming transmission signals through a body channel and to interpret the signals thereafter. In such a case, the receiver can be provided as part of a wearable computer which can be configured to receive incoming BCC transmission signals for further processing.

Reception electrode 208 is coupled to a variable resistor 210. Variable resistor 210 can be a potentiometer or an adjustable resistor with a plurality of fixed tapping points, which allow for a tuning of resistance of the variable resistor 210. According to an embodiment, the resistance of the variable resistor 210 is tuned to modify the channel characteristics. Further, a ground capacitance 212 is provided in the receiver 200 and provides a smoothing function on the received incoming transmission signal. The ground capacitance also contributes, in conjunction with the variable resistor 210, to the characteristics of the body channel 206. In an embodiment, the ground capacitance is provided with a value of 50 pF, but other capacitance values are also possible.

Figure 3:
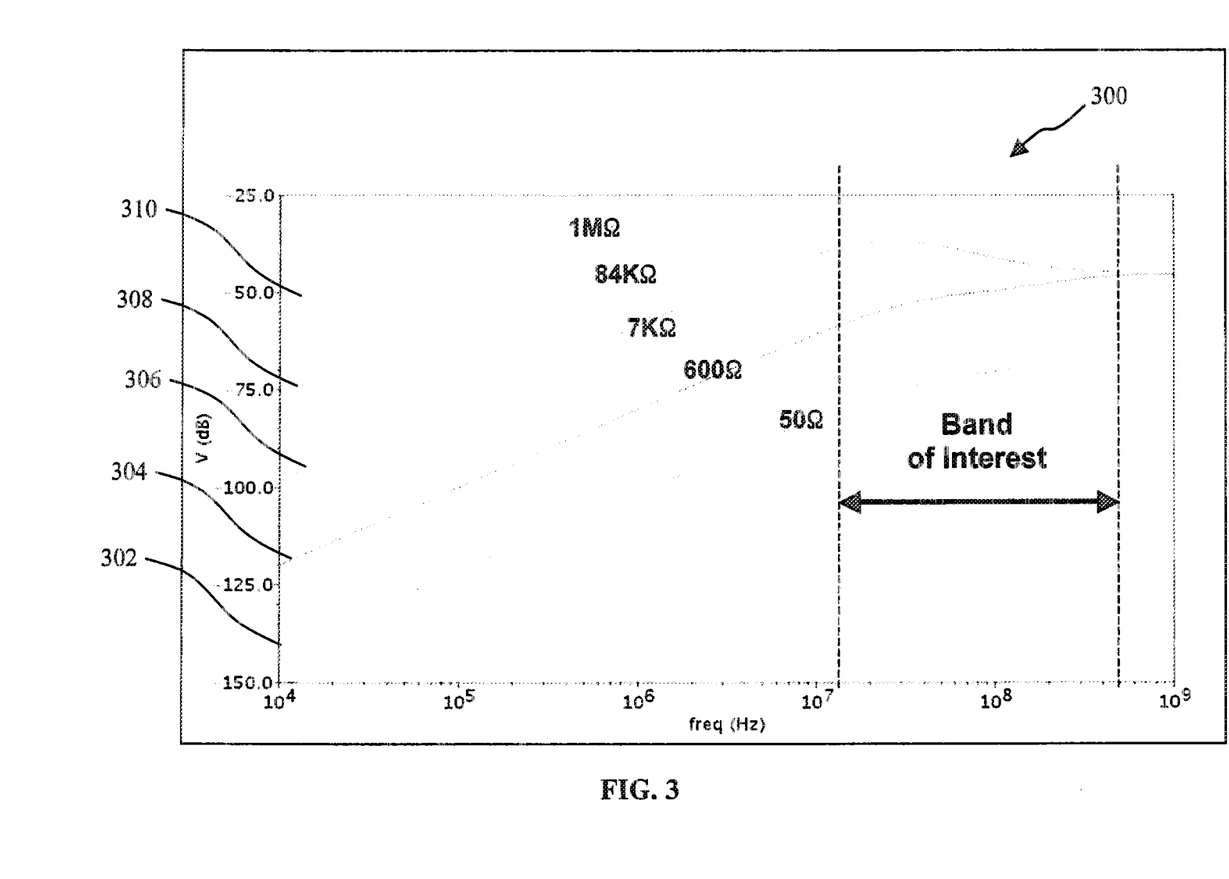
FIG. 3 illustrates a comparison of various input impedances of the receiver in the frequency domain.

FIG. 3 illustrates a comparison of various input impedances of the receiver in the frequency domain. Impedance can be considered the extension of the concept of resistance as applied to alternating current (AC) circuits and signals. In BCC, data signals are modulated onto AC signals for transmission. In chart 300, simulations of the varying input impedance of a receiver according to an embodiment are carried out and plotted. Chart provides the frequency response of a receiver provided with an impedance level of 50Ω 302, 600Ω 304, 7 kΩ 306, 84 kΩ 308 and 1 MΩ 310. The frequency band of interest with relation to BCC applications is from about 40 MHz to about 500 MHz. In other embodiments, a different band of interest may also be of note.

It can be noted from 302, that with a receiver including a small impedance, the body channel 206 seems to take on high pass filter characteristics, especially taking into consideration the capacitive nature of the body channel 206. It is observed that a resultant path loss is comparatively large as compared to when the receiver includes a large impedance, as from 310. It may be observed from 310 that the body channel takes on a band pass filter characteristics, with notably lower path loss. According to an embodiment, the variable resistor is adjusted to configure the body channel 206 to function as a band pass filter. According to a further embodiment, the variable resistor is adjusted to configure the body channel 206 to function as a band pass filter with cutoff frequencies of 40 MHz and 500 MHz.

According to an embodiment, the resistance of the variable resistor 210 is adjusted to vary an input impedance of the receiver 200 to thereafter modify the characteristics of the body channel 206 in order to result in a lower path loss which allows for a lower deterioration of a transmission signal through the body channel 206. In an embodiment, the variable resistor 210 is adjusted so as to result in a body channel characteristic that satisfies a predetermined path loss level.

As the receiver 200 can be provided onto different users, it is also noted that different bodies include different base characteristics such as varying conductivity. As such, varying impedance values of the receiver 200 would bring about various effects. According to an embodiment, a resistor tuning module (not shown) is provided to carry out a tuning of the variable resistor 210 such that the body channel 206 satisfies a predetermined path loss in the passage of a transmission signal. In the resistor tuning module, a feedback loop can be provided for a reiterative adjustment of the variable resistor 210 in achieving the predetermined path loss requirement. According to an embodiment, the variable resistor 210 can be manually tuned to achieve the desired body channel characteristics.

In an embodiment, the incoming transmission signals through the body channel 206 are received at the reception electrode 208 and provided through to a pre-amplifier 214. The preamplifier 214 amplifies the incoming transmission signal to a desired level such as to obtain more defined transitions. Such an amplification is useful as a transmission signal passing through the body channel 206 would result in attenuation of the signal, making it difficult for the actual transmission to be extracted from the signal received at the reception electrode. In order to obtain a higher gain, the preamplifier can be cascaded. According to an embodiment, the preamplifier can be a negative resistance feedback amplifier. Any other semi-conductor based amplification circuit can also be provided to carry out the function of the preamplifier 214.

It is also noted that the preamplifier 214 allows for an adjustable gain value, based on the desired level of the incoming signal for processing. The preamplifier 214 is designed with a maximum gain value. According to an embodiment, the receiver 200 is designed to provide a low path loss of the body channel 206, through the function of the variable resistor 210, thereby allowing an incoming signal to be less affected by attenuation. This contributes to the provision of a preamplifier 214 with a lower gain value in amplifying the incoming signal to the desired level for processing. This allows for cost and power savings in providing for an amplifier with a lower gain.

According to an embodiment, the amplified output from the preamplifier 214 is thereafter provided to a differentiator 216. In providing the transmission signal through the body channel 206, deterioration of the digital signal causes the transmission signal to lose its reference level as the body channel can be considered a capacitive medium. For example, in a multi-level input signal with three levels, low, medium and high, the medium state can be considered a reference or a DC level. It can be difficult to determine and reform the multi-level input signal from the incoming signal at the reception electrode, in particular due to the difficulty in establishing a reference level. This makes the recovery of data difficult by common demodulation approaches such as envelope detection.

The differentiator 216 can be provided as a circuit that provides the time derivative of the input. The function of the differentiator 216 is to extract the data transition in the received signal such that pulses with amplitude corresponding to the transition level are generated. The differentiator 216 highlights and extracts the instances where there is a transition between various levels in the multi-level transmission signal.

According to an embodiment, the receiver 200 can include an integrator 218 coupled to the output of the differentiator 216. The differentiator output is integrated at the integrator 218 with respect to a clock signal as obtained from a clock recovery circuit 220. According to an embodiment, the integrator 218 is configured to integrate the time derivative of the incoming transmission signal using a 25% duty cycle clock signal as obtained from the clock recovery circuit 224.

According to an embodiment, the integrator 218 converts the pulse power of the differentiator output into a voltage value which thereby nullifies the effect of interference and the characteristics of the body channel 206, which degrade the transmission signal. Such an operation can be considered analogous to a matched filter, which provides for a good detection approach in achieving a high receiver sensitivity.

In an embodiment, the output of the integrator 218 is provided to a multi-level detector 222. The multi-level detector 222 can be considered an important building block for multi-level signaling operation in the BCC receiver 200. The detector 222 generates multi-bit digital words by comparing the output voltage level of the integrator 218 with several threshold voltages at every rising edge of the clock signal CLKs. The number of threshold voltages is determined by the number of signal levels in the incoming multi-level transmission signal and can be expressed with the following equation:

$$N_{VTH} = 2(N_{Signal} - 1)$$

where $N_{VTH}$ is the number of voltage thresholds and $N_{Signal}$ is the number of signal levels in the incoming signal. In the case where the incoming multi-level transmission signal includes a 3-level signal, four threshold voltages are required. Further, $N_{VTH}$ number of voltage thresholds require $N_{VTH}+1$ detection levels. In this case, five detection levels are provided in the multi-level detector 222.

In an embodiment, based on the signal level of the integrator output at the time of sampling clock edge, a multi-bit digital output is generated by the multi-level detector 222. It can be observed that an advantage of this multi-level detector arrangement is that of scalability. It would be straightforward to extend the number of levels of the multi-level signal by simply increasing the number of threshold voltages and detection levels. As such, the transmission data rate can be improved efficiently without any change in the receiver architecture or increasing the data bandwidth.

According to various embodiments, the multi-level detector 222 can be applied onto the output of the differentiator 216 to obtain a multi-level representation signal of the incoming transmission signal. The corresponding detection levels can similarly be overlaid on the time derivative signal and additional processing can be carried out in order to provide a multi-level representation signal.

According to various embodiments, the clock recovery circuit 220 carries out a function of recovering the clock reference or clock signal from the incoming transmission signal. This clock signal is thereafter provided as a timing signal for the integrator 218 and the multi-level detector 222 in the receiver 200.

In an embodiment, the clock recovery circuit 220 includes a voltage controlled oscillator. In an embodiment, the clock recovery circuit 220 includes an injection-locked oscillator 224. The injection-locked oscillator 224 receives pulses generated by the differentiator 216 and based on the rising and falling edges of data in the differentiator signal, generates a multi-phase clock signal at its output.

In several currently available BCC receivers, a clock recovery circuit includes crystal oscillator which generates a reference clock signal in conjunction with a phase-locked loop operator. Providing an alternative with the clock recovery circuit according to various embodiments in the present disclosure allows for cost and power savings in eliminating the crystal oscillator.

According to an embodiment, the injection-locked oscillator 224 includes a ring oscillator, to which is provided incoming data as pulses into the ring oscillator. Each pulse of the incoming data, or the differentiator output, in particular, each transition of the signal data in the differentiator output brings about an adjustment in the phase and the frequency of the ring oscillator in the injection-locked oscillator 224, i.e. the injection-locked oscillator 224 attempts to "lock" onto the phase and frequency of each transition.

An advantage of using the injection-locked oscillator 224 can be that a continuous operation and locking can be carried out. The incoming transmission signal as processed with the differentiator 216 and provided as an input to the clock recovery circuit 200 is provided as a real-time continuous signal and each transition can therefore be directly and correspondingly locked, without any lag. According to an embodiment, the ring oscillator in the injection-locked oscillator 224 can include a free running frequency. In an embodiment, the free running frequency of the ring oscillator in the injection-locked oscillator 224 can be set close to the expected or desired frequency used to carry the transmission signal. This allows for a quicker adjustment of the injection-locked oscillator 224 to the phase and frequency of the provided differentiator output.

According to an embodiment, the clock recovery circuit 220 can include a phase selector 226 coupled to receive an input from the injection-locked oscillator 224 and to provide a clock signal output to the integrator 218. The phase selector 226 combines multiple phases of clock signal to generate reset and sampling timing for the integrator 218. Once frequency is matched with the data through the injection-locked oscillator 216, the clock recovery circuit 220 carries out a sampling of the incoming data to determine the optimum point in reproducing the clock signal.

In various embodiments, the clock signal output of the phase selector 226 is provided to the multi-level detector 222 in order to generate a digital representation of the deciphered transmission signal.

The ring oscillator of the injection-locked oscillator 224 can generate eight phases in one period of operation. The phase selector 226 makes a selection of one of these eight phases which corresponds to a timing match.

In order to facilitate optimal selection, a correlator 228 is provided in the clock recovery circuit, which provides a feedback loop in which an output signal of the multi-level detector 222 is received and correlates the optimum choice for selection before passing the selection choice to the phase selector for obtaining the best timing match. The correlator 228 provides the necessary control signals for selecting the required phase amongst the multiple phase signals.

According to an embodiment, the receiver 200 can include a analog front-end (AFE) 230 formed by various components or modules or circuits in supporting the function of the AFE 230 to amply a received incoming transmission signal and to demodulate and regenerate the incoming transmission signal for further processing.

According to an embodiment, the receiver 200 can include an AFE 230 including preamplifier 214, differentiator 216, integrator 218 and multi-level detector 222. In other embodiments, the AFE 230 may simply include the preamplifier 214 and differentiator 216, together which can still allow the AFE 230 to carry out the earlier listed functions. The AFE can also be representatively understood to be a pulse power detector in processing and reproducing the transmission signal.

Figure 4:
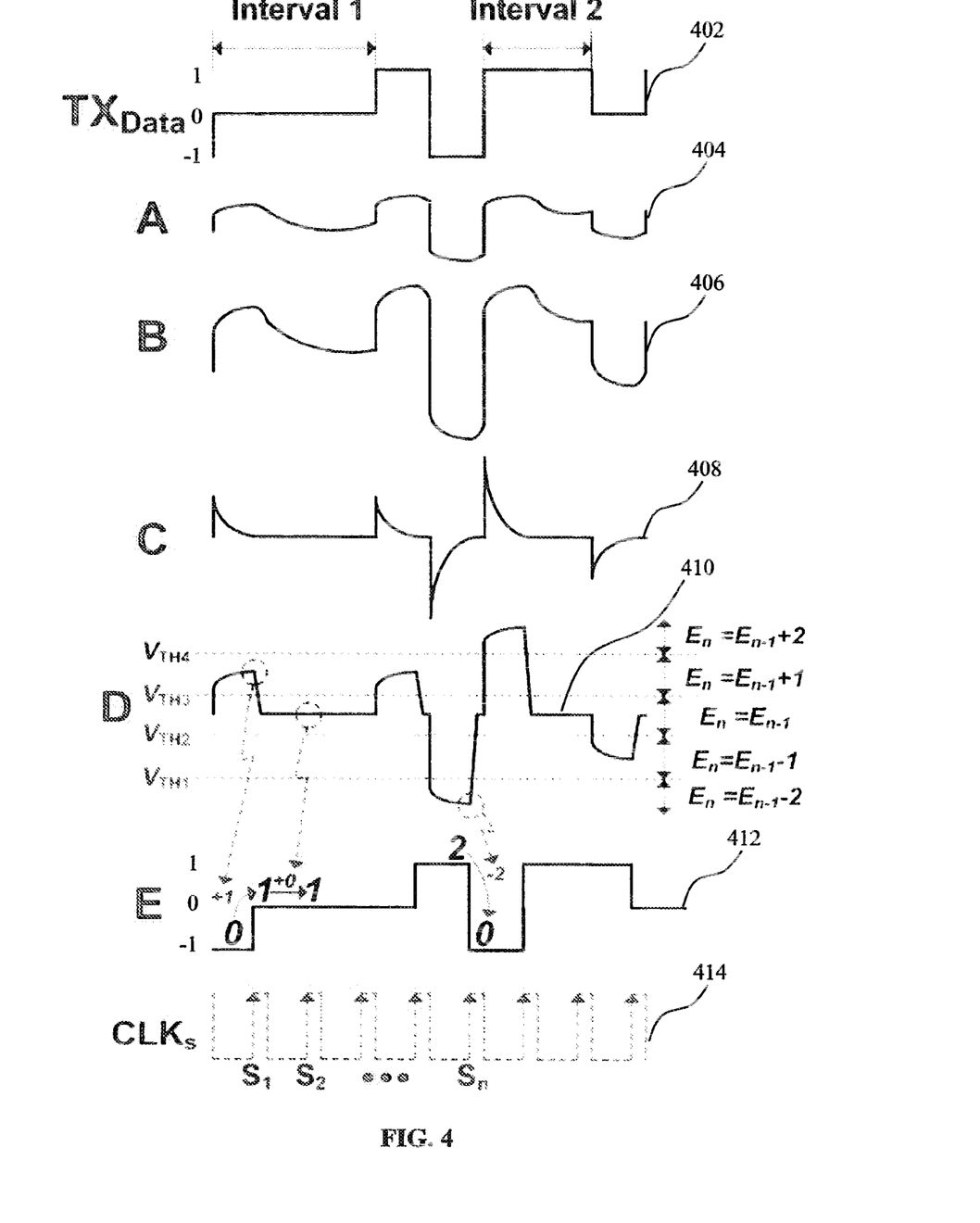
FIG. 4 illustrates a timing diagram for the operation of the receiver according to an embodiment.

FIG. 4 illustrates a timing diagram for the operation of the receiver according to an embodiment. The timing diagram is provided to illustrate the condition of an incoming transmission signal as received from the reception electrode 208 and processed in various stages in the receiver 200.

In 402, a multi-level transmission signal TX is generated by driver 202 and provided to transmission electrode 204 for transmission through a body channel 206 to a reception electrode 208. In an embodiment, the multi-level signal is a 3-level multi-level signal, the data modulated as 3 levels—−1, 0, 1 in the transmission signal. In other embodiments, a 5-level (with states −1, −0.5, 0, 0.5, 1) or a 7-level (−1, −0.67, −0.33, 0, 0.33, 0.67, 1) or higher level signal can be provided. The receiver 200 is adaptable to receive a variation in signal levels of the multi-level signal.

In 404, signal A illustrates the signal received at the reception electrode 208, which is correspondingly marked A on FIG. 2. As can be observed, although three consecutive bits with a middle voltage (Interval 1) and two consecutive bits with a high voltage (Interval 2) are sent from the transmitter 202, the incoming received transmission signal A has different voltage levels at the corresponding intervals. This effect is caused by the high pass filtering of the transmitted data by the body channel 206.

In 406, signal B illustrates the signal as amplified by the preamplifier 214. It can be observed that a gain has been applied to the signal and the amplitudes of data transitions are accentuated.

In 408, signal C illustrates the time derivation signal as provided as an output of differentiator 216. As indicated the differentiator extracts the data transitions of the received signal. In differentiating the time-based amplified signal B, the data transitions of the signal B are clearly demarcated and can be extracted therefrom.

In 410, signal D illustrates the output of the integrator 218 carrying out an integration of the differentiator output with respect to a clock signal CLKs 414. The integrator 218 converts the pulse power into a voltage value. Carrying out the integration nullifies the effect of interference and channel characteristics which degrade the transmission signal TX. In an embodiment, in carrying out the integration of the time derivative with the integrator 218, the integration starts at falling edge of the CLK signal and ends at rising edge of the CLK signal.

In 414, the clock signal CLKs is illustrated, being the output of clock recovery circuit 220. CLKs has been determined by the injection-locked oscillator 224 to include a time period matching that of the transmission signal TX. Further, in carrying out the integration with the integrator 216, the integrator 216 utilizes a clock signal operating at a 25% duty cycle. By using the 25% duty cycle, a wider integration window (75%) can be obtained, which enables capturing the maximum bit interval for integration and minimizes the possibility of errors as opposed to only half bit interval when 50% duty cycle is used. A 25% duty cycle is used because it can be easily generated by combining two of the eight phases created by injection locked oscillator.

In various embodiments, other predetermined duty cycle values can be used in the integration of the time derivative. In embodiments, a duty cycle value can be from a range of 10% to 50%. The lower limit on duty cycle is imposed by the time required to reset the integrator, and the higher limit is the duration of the pulse created by the differentiator i.e. the length of the pulse to be integrated.

Returning to 410, the multi-level detector 222 thereafter applies $N_{VTH}=2(N_{Signal}-1)=4$ voltage thresholds onto signal D in determining a multi-level signal from the incoming transmission signal. In an embodiment, the multi-level detector 222 carries out a comparator function on the output signal of the integrator 218. The 4 voltage thresholds are depicted on 410 as $V_{TH1}$, $V_{TH2}$, $V_{TH3}$, and $V_{TH4}$. The four threshold voltages as such divide the signal into five levels. Further, according to an embodiment, when the integrator signal is determined to fall within any one of the 5 threshold levels, the signal level of a resultant multi-level representative signal E is correspondingly adjusted by the following: $E_n=E_{n-1}-2$, $E_n=E_{n-1}-1$, $E_n=E_{n-1}$, $E_n=E_{n-1}+1$, $E_n=E_{n-1}+2$, where $E_n$ is defined as the output signal in a clock period n.

Based on the signal level at the time of sampling clock edge, a multi-bit digital output is generated by the detector. That is, if the integer output is within the one or two upper (lower) area from the middle area as the center, the digital output equals to adding (subtracting) one or two to the previous digital value. The digital output is maintained with the previous value if the output is in the middle area.

Finally, in 412, signal E illustrates the output generated by the receiver 200, or specifically, from the multi-level detector 222. The output signal E is representative of the transmission signal TX being transmitted through the body channel 206 and processed by the receiver 200.

Figurative examples of the multi-level detector 222 carrying out a comparative function in generating a multi-level representative signal are provided as follows. According to an embodiment, at sampling instant $S_1$, incoming signal D to the multi-level detector 222 can be observed to be between $V_{TH3}$ and $V_{TH4}$ which corresponds to threshold level $E_{n-1}+1$. As a result, the output signal E is shifted one level up from a previous transition level, in this case at a 0 level. At instance $S_2$, the level of the incoming signal D is between $V_{TH2}$ and $V_{TH3}$, hence the output is kept at the same level as the previous transition. If at any sampling instant, the incoming signal D falls below $V_{TH1}$ or above $V_{TH4}$, the output is shifted two levels down or two levels up respectively.

As can be noted, the multi-level signal TX is correctly extracted from the attenuated received signal A. A slight time lag is introduced due to the clock-signal based integration carried out, at a 25% duty cycle.

A simulation was carried out by the present inventors in validating a receiver according to various embodiments. A proposed wideband signaling digital transceiver was fabricated with 65 nm standard CMOS process technology, where the threshold voltages for nMOS and pMOS at saturation are 0.42V and 0.45V respectively. The core area of such a digital transceiver layout is provided as about 2×2 mm². In verification, it is determined that the receiver consumes 8 mW from a 1.2V supply at a 80 MHz operating frequency.

Figure 5:
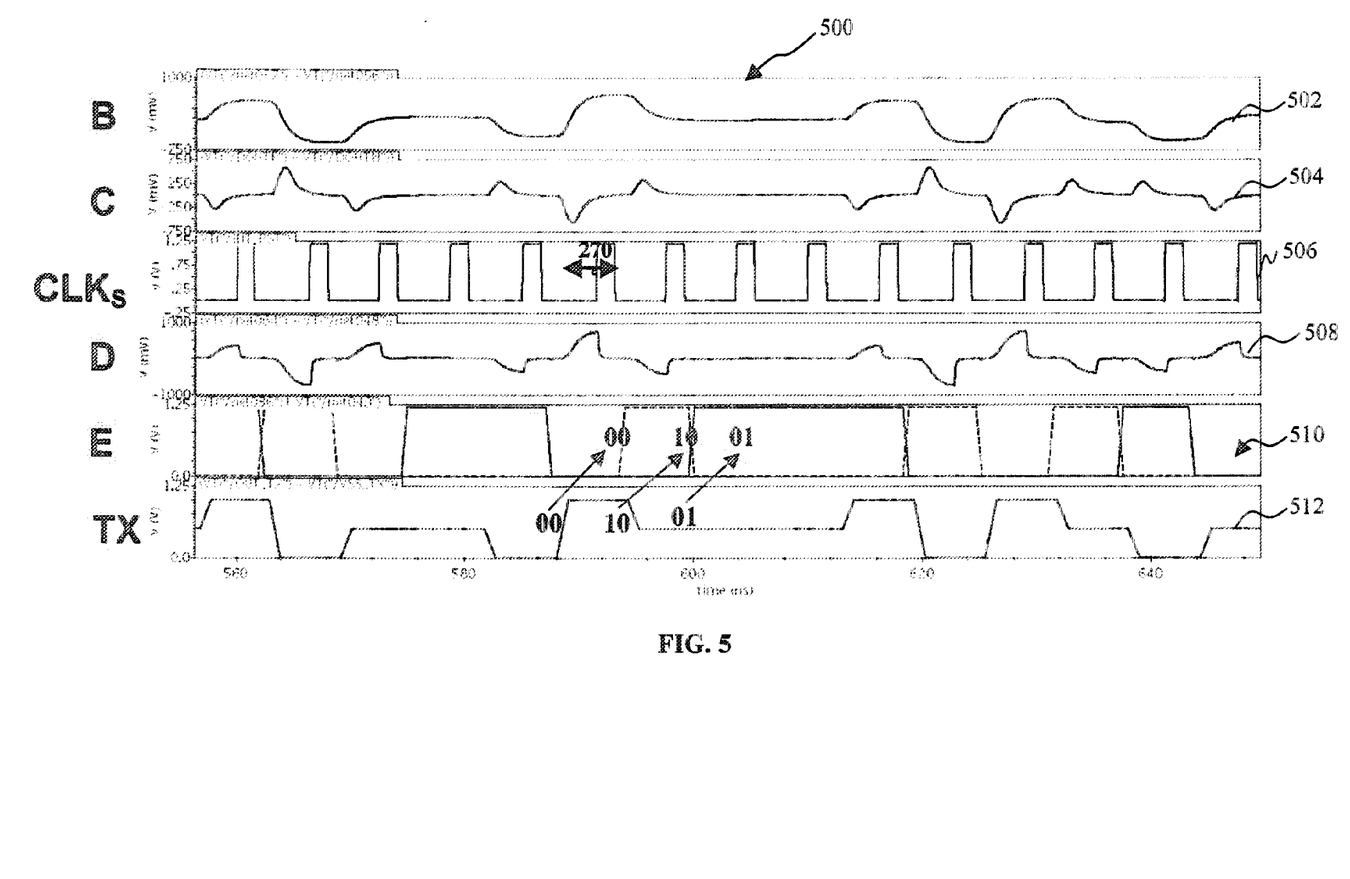
FIG. 5 illustrates simulation results pertaining to the present stages of operation of the receiver according an embodiment.

In verifying the operation of the fabricated receiver, Spectre simulation in a 65 nm standard CMOS process with a 1.2 V power supply is used and its results are shown in FIG. 5. FIG. 5 illustrates simulation results 500 pertaining to the present stages of operation of the receiver according an embodiment. The transmitter transfers a 3-level signal (TX) which has 1 V peak-to-peak voltage. TX is illustrated in 512.

In carrying out the operation of the receiver module, the receiver module obtains a signal A having been received by a reception electrode. The received transmission signal is about 10-mV. The signal A is thereafter amplified, with a gain of about 30-dB, to a signal B with a preamplifier. B is illustrated in 502.

In 504, the readings obtained at C substantially accurately reflect the differentiation carried out on the amplified signal by the differentiator. Concurrently, the differentiator output is provided to a clock recovery service in order to extract out the clock signal from the inbound transmission signal. In 506, the clock signal $CLK_S$ is measured and adopted as part of the simulation runs. It is noted that the clock signal $CLK_S$ operates at a 25% duty cycle, or in other words and as shown in 506, a phase difference of 270° between active clock pulses.

In 508, the differentiator output signal is integrated with respect to $CLK_S$ and charted as signal D. Further, a multi-level detector first calculates a plurality of voltage and places a plurality of detection levels in superimposition over the signal D. This allows for the determination of transitions as extracted from the transmission signal and the generation of an output signal E, illustrated in room 510.

A comparison between the output signal E and the initial transmission signal TX shows a consistency and accuracy between the extracted and processed multi-level signal.

Figure 6:
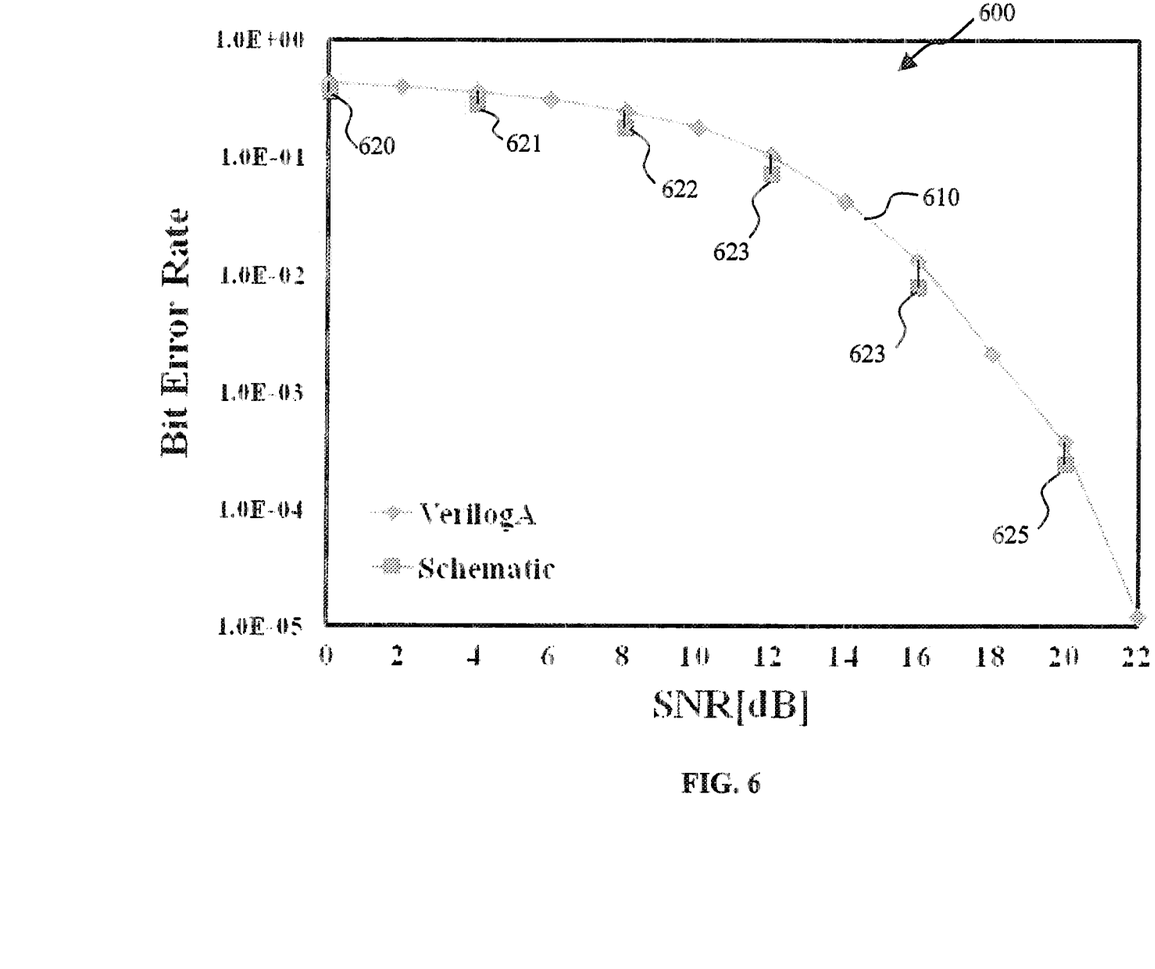
FIG. 6 illustrates a bit error rate (BER) performance of the simulation.

FIG. 6 illustrates a bit error rate (BER) performance of the simulation. Chart 600 provides the BER with respect to the signal to noise ratio (SNR) of a BCC receiver according to an embodiment. A testbench simulation based on the BCC receiver is carried out and the BER results charted. It can be observed that the receiver requires an SNR of approximately 19 dB to achieve BER of $10^{-3}$.

Verilog A plot 610 charts out simulation results based on a behavior model while Schematic determination points 620-625 represent results of a simulation carried out on a physical transistor level. For a system design, its functionality is first verified with a behavior model prior to verification on a real circuit design. The results in chart 600 show that the behavioral model and the schematic level results match well.

Further, the performance of the BCC receiver according to various embodiments is summarized and compared with recently reported digital BCC receivers in Table 1 below.

TABLE 1

Comparison of BCC receivers

| Title | A 0.2 mW 2 Mb/s Digital Transceiver Based on Wideband Signaling for Human Body Communications | A 0.9 V 2.6 mW Body-Coupled Scalable PHY Transceiver for Body Sensor Applications | A 2.75 mW Wideband Correlation-Based Transceiver for Body-Coupled Communication | Embodiment according to present disclosure |
|---|---|---|---|---|
| Process | 0.25 µm CMOS | 0.18 µm CMOS | 0.13 µm CMOS | 65 nm CMOS |
| Supply voltage | 1 V | 0.9 V | 1.2 V | 1.2 V |
| Modulation | No | 3-level Pulse-position modulation | Manchester coding | Multi-level signaling |
| Max. data rate | 2 Mb/s | 10 Mb/s | 8.5 Mb/s | 80 Mb/s |
| Power consumption | 5 mW | 2.6 mW | 2.75 mW | 8 mW |
| Sensitivity | −35 dBm | −30 dBm | −60 dBm | −60 dBm |
| Energy/bit | 2.5 nJ/b | 0.26 nJ/b | 0.37 nJ/b | 0.1 nJ/b |

According to various embodiments, a receiver can achieve 80 Mb/s data transfer rate with a power consumption of 8 mW from 1.2 V, which corresponds to an energy consumption of 0.1 nJ/b. It can be seen that a receiver according to various embodiments in the present disclosure achieves comparatively the highest data rate, which can be about 8 times higher than the receivers of other published work. In addition, energy efficiency is also improved by approximately a factor of 3.

In various embodiments, a multi-level signal modulation scheme can also be utilized. Such a modulation scheme allows for more advanced modulation to be provided, in conjunction with the multi-level signaling. This allows for the possibility of an even higher data rate to be achieved. For example, a walsh coding modulation scheme can be provided for use. In various embodiments, any effective modulation scheme can be used, for example, a quadrature amplitude modulation (QAM) scheme including 4-QAM, 16-QAM, etc., a pulse amplitude modulation (PAM) scheme including 4-PAM, 16-PAM, etc.

Figure 7:
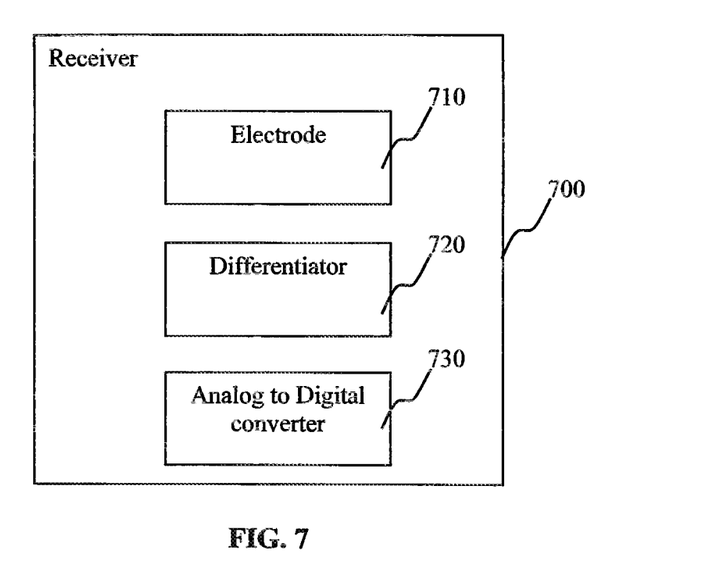
FIG. 7 illustrates a schematic of a receiver for body channel communication according to an embodiment.

FIG. 7 illustrates a schematic of a receiver for body channel communication 700 according to an embodiment of the present disclosure. An electrode 710 is provided, configured to receive an incoming signal transmitted as a multi-level transmission signal from a transmitter through a body channel. A differentiator 720 is also provided and configured to obtain a time derivative of the incoming signal. Further, an analog to digital converter 730 is provided and configured to generate a multi-level representation signal representing the multi-level transmission signal based on the time derivative.

In an embodiment, the receiver 700 further includes an integrator configured to integrate the time derivative of the incoming signal.

In an embodiment, the integrator is configured to integrate the time derivative of the incoming signal with respect to a clock signal operating at a predetermined duty cycle.

In an embodiment, the receiver further includes a clock recovery circuit configured to determine the clock signal.

In an embodiment, the clock recovery circuit is configured to generate a clock signal based on the incoming signal.

In an embodiment, the clock recovery circuit further includes an injection-locked oscillator configured to receive the time derivative of the incoming signal and to generate the clock signal therefrom.

In an embodiment, the receiver further includes a phase selector configured to receive the clock signal from the injection-locked oscillator and to select a phase corresponding to a timing match from a plurality of phase divisions in the clock signal.

In an embodiment, the receiver further includes a feedback loop wherein the multi-level output signal is provided to a correlator for a phase selection correlation to be provided to the phase selector.

In an embodiment, the analog to digital converter is a multi-level detector configured to generate a plurality of digital words by comparing each of the plurality of data transitions to a plurality of thresholds in generating the multi-level output signal.

In an embodiment, the plurality of thresholds is expressed as $N_{VTH}=2(N_{Signal}-1)$, where $N_{VTH}$ is the number of thresholds and $N_{Signal}$ is the number of signal levels in the incoming signal.

In an embodiment, the receiver further includes a variable resistor coupled to the electrode, the variable resistor configured to adjust the impedance of the receiver with respect to the body channel.

In an embodiment, the variable resistor is configured to adjust the impedance of the receiver to configure the characteristics of the body channel to represent a band pass filter.

Figure 8:
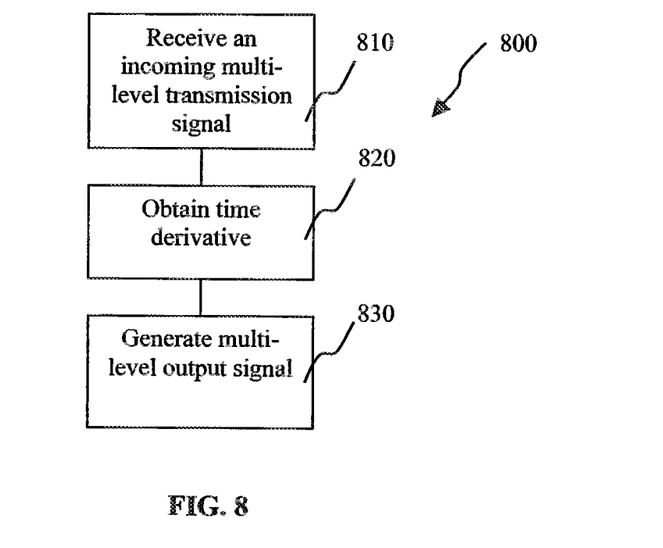
FIG. 8 illustrates a block diagram of a method according to an embodiment.

FIG. 8 illustrates a block diagram of a method 800 according to an embodiment of the present disclosure. Method 800 can be a method of controlling a receiver for body channel communication. In 810, the method can include receiving an incoming signal transmitted as a multi-level transmission signal from a transmitter through a body channel. In 820, the method can include obtaining a time derivative of the incoming signal. In 830, the method can include generating a multi-level representation signal representing the multi-level transmission signal based on the time derivative.

In an embodiment, the method further includes integrating the time derivative.

In an embodiment, the method further includes integrating the time derivative with respect to a clock signal.

In an embodiment, the method further includes integrating the time derivative with respect to the clock signal operating at a predetermined duty cycle.

In an embodiment, the method further includes generating a clock signal from the incoming signal.

In an embodiment, generating the clock signal based on the incoming signal includes receiving the time derivative of the incoming signal and generating the clock signal therefrom.

In an embodiment, obtaining the clock signal includes receiving the generated clock signal and selecting a phase corresponding to a timing match from a plurality of phase divisions in the clock signal.

In an embodiment, obtaining the clock signal further includes carrying out a phase selection correlation based on the multi-level representation signal in a feedback loop and selecting a phase division based on the phase selection correlation.

In an embodiment, the method further includes generating a plurality of digital words by comparing each of the plurality of data transitions to a plurality of thresholds in generating the multi-level output signal.

In an embodiment, the plurality of thresholds is expressed as $N_{VTH}=2(N_{Signal}-1)$, where $N_{VTH}$ is the number of thresholds and $N_{Signal}$ is the number of signal levels in the incoming signal.

In an embodiment, the method further includes adjusting the impedance of the receiver with respect to the body channel.

In an embodiment, the method further includes adjusting the impedance of the receiver to configure the characteristics of the body channel to represent a band pass filter.

According to an embodiment, there is provided a transmitter for body channel communication including a driver configured to generate a multi-level transmission signal including at least three signal levels, and a transmission electrode configured to transmit the multi-level transmission signal through a body channel.

According to an embodiment, there is provided a system for body channel communication, including a driver configured to generate and transmit a multi-level transmission signal including at least three signal levels through a body channel, and a receiver configured to receive the multi-level transmission signal transmitted through the body channel, and generate a multi-level representation signal of the multi-level transmission signal therefrom.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A receiver for body channel communication comprising:
an electrode configured to receive an incoming signal transmitted as a multi-level transmission signal from a transmitter through a body channel;
a differentiator configured to obtain a time derivative of the incoming signal; and
an analog to digital converter configured to generate a multi-level representation signal representing the multi-level transmission signal based on the time derivative, wherein the analog to digital converter is a multi-level detector configured to generate a plurality of digital words by comparing each of the plurality of data transitions to a plurality of thresholds in generating the multi-level representation signal.

2. The receiver according to claim 1, further comprising an integrator configured to integrate the time derivative of the incoming signal.

3. The receiver according to claim 2, wherein the integrator is configured to integrate the time derivative of the incoming signal with respect to a clock signal operating at a predetermined duty cycle.

4. The receiver according to claim 3, further comprising a clock recovery circuit configured to determine the clock signal.

5. The receiver according to claim 4, wherein the clock recovery circuit is configured to generate a clock signal based on the incoming signal.

6. The receiver according to claim 5, the clock recovery circuit further comprising an injection-locked oscillator configured to receive the time derivative of the incoming signal and to generate the clock signal therefrom.

7. The receiver according to claim 6, further comprising a feedback loop wherein the multi-level representation signal is provided to a correlator for a phase selection correlation to be provided to the phase selector.

8. The receiver according to claim 1, further comprising a variable resistor coupled to the electrode, the variable resistor configured to adjust the impedance of the receiver with respect to the body channel.

9. The receiver according to claim 8, wherein the variable resistor is configured to adjust the impedance of the receiver to configure the characteristics of the body channel to represent a band pass filter.

10. A method of controlling a receiver for body channel communication, comprising:
receiving an incoming signal transmitted as a multi-level transmission signal from a transmitter through a body channel;
obtaining a time derivative of the incoming signal; and
generating a multi-level representation signal representing the multi-level transmission signal based on the time derivative,
wherein the method further comprises generating a plurality of digital words by comparing each of the plurality of data transitions to a plurality of thresholds in generating the multi-level representation signal.

11. The method according to claim 10, further comprising integrating the time derivative with respect to a clock signal.

12. The method according to claim 11, further comprising integrating the time derivative with respect to the clock signal operating at a predetermined duty cycle.

13. The method according to claim 11, wherein generating the clock signal based on the incoming signal comprises receiving the time derivative of the incoming signal and generating the clock signal therefrom.

14. The method according to claim 13, wherein generating the clock signal further comprises carrying out a phase selection correlation based on the multi-level representation signal in a feedback loop and selecting a phase division based on the phase selection correlation.

15. The method according to claim 10, further comprising generating a clock signal based on the incoming signal.

16. The method according to claim 10, further comprising adjusting the impedance of the receiver with respect to the body channel.

17. The method according to claim 16, wherein said adjusting the impedance of the receiver comprises adjusting the impedance of the receiver to configure the characteristics of the body channel to represent a band pass filter.

18. A system for body channel communication comprising:
- a transmitter comprising:
  - a driver configured to generate a multi-level transmission signal comprising at least three signal levels; and
  - a transmission electrode configured to transmit the multi-level transmission signal through a body channel, and
- a receiver comprising:
  - an electrode configured to receive the multi-level transmission signal from the transmitter through the body channel;
  - a differentiator configured to obtain a time derivative of the multi-level transmission signal; and
  - an analog to digital converter configured to generate a multi-level representation signal representing the multi-level transmission signal based on the time derivative, wherein the analog to digital converter is a multi-level detector configured to generate a plurality of digital words by comparing each of the plurality of data transitions to a plurality of thresholds in generating the multi-level representation signal.

* * * * *